US012627920B2

(12) United States Patent
Zhang et al.

(10) Patent No.: US 12,627,920 B2
(45) Date of Patent: May 12, 2026

(54) EXPANDABLE ACOUSTIC REINFORCEMENT MEMBER AND MANUFACTURING METHOD THEREFOR AND USE THEREOF

(71) Applicant: SSI NEW MATERIAL (ZHENJIANG) CO., LTD., Zhenjiang (CN)

(72) Inventors: Lei Zhang, Zhenjiang (CN); Junjie Zhao, Zhenjiang (CN); Renkun Liu, Zhenjiang (CN); Zhendan Zhang, Zhenjiang (CN); Mingbo Guo, Zhenjiang (CN); Yuanhong Ma, Zhenjiang (CN)

(73) Assignee: SSI NEW MATERIAL (ZHENJIANG) CO., LTD., Zhenjiang (CN)

( * ) Notice: Subject to any disclaimer, the term of this patent is extended or adjusted under 35 U.S.C. 154(b) by 108 days.

(21) Appl. No.: 18/444,814

(22) Filed: Feb. 19, 2024

(65) Prior Publication Data

US 2024/0334116 A1 Oct. 3, 2024

Related U.S. Application Data

(63) Continuation of application No. PCT/CN2022/110785, filed on Aug. 8, 2022.

(30) Foreign Application Priority Data

Aug. 19, 2021 (CN) .......................... 202110952864.3

(51) Int. Cl.
*H04R 1/28* (2006.01)
*C04B 14/02* (2006.01)
(Continued)

(52) U.S. Cl.
CPC .......... *H04R 1/2811* (2013.01); *C04B 14/022* (2013.01); *C04B 14/041* (2013.01);
(Continued)

(58) Field of Classification Search
CPC ...... H04R 1/2811; H04R 1/025; H04R 31/00; C04B 14/022; C04B 14/041; C04B 16/00;
(Continued)

(56) References Cited

U.S. PATENT DOCUMENTS 2,151,083 A 3/1939 Christensen et al.
2007/0026216 A1 2/2007 Weingartner et al.
(Continued)

FOREIGN PATENT DOCUMENTS

CN 104869522 A 8/2015
CN 108668208 A 10/2018
(Continued)

OTHER PUBLICATIONS

First Office Action issued on Mar. 20, 2025 for counterpart Korean patent application No. 10-2024-7009061, 14 pages.
(Continued)

*Primary Examiner* — Sean H Nguyen
(74) *Attorney, Agent, or Firm* — Hoffman Warnick LLC

(57) ABSTRACT

An expandable acoustic reinforcement member and a manufacturing method therefor and the use thereof. When one or more expansion trigger conditions are applied, an apparent volume of the member is increased, and an internal pore volume is increased. The member is applied to a loudspeaker, and an expansion trigger treatment is performed on the member, so that the apparent volume of the member is increased, and the internal pore volume is increased, such that the acoustic performance of the loudspeaker assembled with the member is improved; meanwhile, pressing is performed between the members, and between the member and
(Continued)

a cavity wall of a specific space of the loudspeaker, so that the member is fixed, thereby achieving the effects of eliminating noise in the use process of the loudspeaker and preventing collisions and crushing of the member to generate falling powder, and prolonging the service life of the member.

17 Claims, 6 Drawing Sheets

(51) Int. Cl.

| | | |
|---|---|---|
| *C04B 14/04* | (2006.01) | |
| *C04B 16/00* | (2006.01) | |
| *C04B 26/04* | (2006.01) | |
| *C04B 26/06* | (2006.01) | |
| *C04B 26/12* | (2006.01) | |
| *C04B 38/00* | (2006.01) | |
| *C04B 38/06* | (2006.01) | |
| *C04B 103/00* | (2006.01) | |
| *C04B 111/52* | (2006.01) | |
| *H04R 1/02* | (2006.01) | |
| *H04R 31/00* | (2006.01) | |

(52) U.S. Cl.
CPC ............ *C04B 16/00* (2013.01); *C04B 26/045* (2013.01); *C04B 26/06* (2013.01); *C04B 26/122* (2013.01); *C04B 38/0054* (2013.01); *C04B 38/065* (2013.01); *H04R 1/025* (2013.01); *H04R 31/00* (2013.01); *C04B 2103/0078* (2013.01); *C04B 2111/52* (2013.01)

(58) Field of Classification Search
CPC ..... C04B 26/045; C04B 26/06; C04B 26/122; C04B 38/065; C04B 2103/0078
USPC ........................................ 381/332
See application file for complete search history.

(56) References Cited

U.S. PATENT DOCUMENTS

| | | | |
|---|---|---|---|
| 2015/0271592 A1* | 9/2015 | Papakyriacou | ......... C01B 39/44 |
| | | | 252/62 |
| 2016/0309254 A1 | 10/2016 | Lembacher et al. | |
| 2019/0139527 A1 | 5/2019 | Cao | |
| 2019/0253788 A1 | 8/2019 | Pierce | |
| 2020/0152165 A1 | 5/2020 | Gavryushin et al. | |
| 2020/0372890 A1* | 11/2020 | Gavryushin | ......... G10K 11/165 |

FOREIGN PATENT DOCUMENTS

| | | | |
|---|---|---|---|
| CN | 111534017 A | 8/2020 | |
| CN | 111534018 A | 8/2020 | |
| CN | 111534058 A | 8/2020 | |
| CN | 111770399 A | 10/2020 | |
| CN | 112876277 A | 6/2021 | |
| CN | 216930316 U | 7/2022 | |
| EP | 2424270 A1 | 2/2012 | |

OTHER PUBLICATIONS

Supplemental search report issued on Feb. 7, 2025 for counterpart Chinese patent application No. 202110952864.3.
The First Office Action and Search Report issued on Jun. 27, 2024 for counterpart Chinese patent application No. 202110952864.3.
The Second Office Action issued on Nov. 16, 2024 for counterpart Chinese patent application No. 202110952864.3, 20 pages.
International Search Report in PCT/CN2022/110785, mailed Nov. 8, 2022, 2 pages.
Extended European Search Report issued on Jun. 17, 2025 for counterpart European patent application No. 22857623.7.
Examination Report issued on Oct. 9, 2025 for counterpart Indian patent application No. 202427017514.

* cited by examiner

150

210

150

210

150

310

150

310

150

410

150

410

500 preparing an expandable acoustic enhancing slurry — 510 determining the finished product type — 520

530 — molding of particles

540 — molding of sheets

560 — assembling into the application device filling into the application device — 550

EXPANDABLE ACOUSTIC REINFORCEMENT MEMBER AND MANUFACTURING METHOD THEREFOR AND USE THEREOF

FIELD OF TECHNOLOGY

The present invention relates to an expandable acoustic enhancer and the production method and application thereof, which belongs to the technical field of electroacoustic products.

BACKGROUND ART

European Patent EP 2424270 A1 discloses a technique for virtually enlarging the rear cavity of a speaker with zeolite materials. By arranging acoustic enhancing materials with gas adsorption and desorption capabilities, such as zeolite and activated carbon, in the speaker cavity, the performance of the speaker can be achieved as if the volume of the cavity had been doubled while the volume of the cavity remained unchanged.

In recent years, this technology has been widely used in speakers for smartphones, tablet PCs, thin and light laptops, and other devices, enabling them to achieve better acoustic performance with limited volume and space.

At present, the acoustic enhancing material is mostly in the form of granular microspheres having a diameter of 100-600 micrometers. The application of the granular microspheres to the back cavity of a micro-speaker can achieve the effect of lowering the lowest resonance frequency, enhancing the low frequency sensitivity, and improving the low frequency performance of the speaker. However, the particle-type acoustic enhancing material has been reported to have problems such as particle fragmentation, powder shedding, and collision murmur during its application. This problem is especially obvious in low-temperature environments, and the reasons for this type of problem include: the morphology of the acoustic enhancing material particles and the limitations of the filling technology. Specifically, the acoustic enhancing material particles in the speaker cavity space is difficult to reach 100% full, that is, there will be free space for free movement of the acoustic enhancing material particles in the cavity. In addition, when the speaker is in operation, the diaphragm pushes the airflow, and the airflow pushes the acoustic enhancing material particles, causing the acoustic enhancing material particles to vibrate, which leads to collisions between the acoustic enhancing particles and between the acoustic enhancing particles and the speaker housing, resulting in the above problem.

In addition, due to the current rise in consumer demand for sound performance in electronic devices, speaker design requires lower F0 values and tends to improve sound performance by increasing amplitude. However, the negative effects include an increase in the operating temperature of the speaker, etc., and the existing acoustic enhancing material particles usually have low thermal conductivity, which is not conducive to heat dissipation in the speaker.

In this regard, Chinese patent CN 111163392 A aims to secure acoustic enhancing material particles by simply mixing expandable microspheres with acoustic enhancing material particles and then filling them in a speaker. However, the technical solution has the following drawback: the prior art only simply mixes the acoustic enhancing material particles with the expandable microsphere material, but in actual mass production applications, it tends to occur that the ratio of the expandable microsphere material to the acoustic enhancing material particles in a single micro-speaker after filling is not consistent with the target ratio in the mass mixing. This leads to poor homogeneity of the acoustic performance of the same batch of speakers, and it is not possible to truly realize reliable large-volume industrialized production. Chinese patent CN 111534017 A discloses an improvement on the basis of the above scheme, in which the dispensable material are bonded one by one with the acoustic conditioning material particles to realize the purpose of collision buffering of the acoustic conditioning material particles. However, the technical solution still has the following drawbacks: the volume of acoustic conditioning material that can be filled in the same fillable space decreases significantly in order to realize effective collision cushioning. Moreover, in order to realize effective bonding, the acoustic conditioning material particles need to lose a certain amount of surface area, which reduces the number of channels through which air can enter the acoustic conditioning material particles. Both of these factors result in a reduction in the acoustic performance of the speaker fitted with this component compared to a speaker fitted with conventional acoustic conditioning material. In addition, the size of the particles of the conventional acoustic conditioning material is on the order of micrometers, and this technical solution is also unable to realize reliable large-volume industrial production.

Therefore, it is a technical problem urgently to be solved in the field to provide a novel expandable acoustic enhancer and the production method and use thereof.

SUMMARY OF THE INVENTION

In order to solve the above-mentioned disadvantages and defects, it is an object of the present invention to provide an expandable acoustic enhancer.

It is another object of the present invention to provide a method for producing the expandable acoustic enhancer.

It is a further object of the present invention to provide a speaker comprising the expandable acoustic enhancer.

It is yet another object of the present invention to provide a method of assembling the expandable acoustic enhancer.

It is the last object of the present invention to provide an electronic device, provided with the expandable acoustic enhancer in a rear cavity of a speaker of the electronic device.

In order to achieve the above objects, in an aspect, the present invention provides an expandable acoustic enhancer, wherein the expandable acoustic enhancer has an increase in apparent volume and an increase in internal pore volume upon application of one or more expansion triggering conditions.

In a specific embodiment of the expandable acoustic enhancer of the present invention, the expandable acoustic enhancer comprises one or more of expandable acoustic enhancing particles, expandable acoustic enhancing sheets and an expandable acoustic enhancing coating.

In a specific embodiment of the expandable acoustic enhancer of the present invention, the expandable acoustic enhancer has homogeneous properties from its inside to its surface and is not layered.

In a specific embodiment of the expandable acoustic enhancer of the present invention, upon application of one or more expansion triggering conditions, the expandable acoustic enhancer has an apparent volume which is 100-150% of the apparent volume before application of the expansion triggering conditions.

In a specific embodiment of the expandable acoustic enhancer of the present invention, the expansion triggering conditions include one or more of mechanical force, temperature, humidity, acoustic wave, light, electric current, magnetic field force, chemical atmosphere and air pressure.

In a specific embodiment of the expandable acoustic enhancer of the present invention, in the initial state, the expandable acoustic enhancing particles have a diameter of 50-900 μm, and the expandable acoustic enhancing sheets have a thickness of 50-900 μm.

In a specific embodiment of the expandable acoustic enhancer of the present invention, the expandable acoustic enhancer is produced by mixing raw materials for preparing the expandable acoustic enhancer with a solvent to formulate an expandable acoustic enhancing slurry and then molding the slurry;

wherein the raw materials comprise a gas adsorption material, a binder and an expandable material, and the expandable material is included in an amount of 0.1-10% and the binder is included in an amount of 1-10%, based on 100% of the total weight of the gas adsorption material;

alternatively, the raw materials comprise a gas adsorption material and an expandable binder, wherein the expandable binder is included in an amount of 0.5-10%, based on 100% of the total weight of the gas adsorption material;

wherein each of the amount of the binder and the expandable binder is measured based on the solid content in the binder or the expandable binder.

In a specific embodiment of the expandable acoustic enhancer of the present invention, the raw materials further comprise a gas adsorption material, a binder and an expandable binder.

In a specific embodiment of the expandable acoustic enhancer of the present invention, the gas adsorption material comprises one or more of molecular sieves, activated carbon, porous metal oxides and porous metal-organic frameworks.

In a specific embodiment of the expandable acoustic enhancer of the present invention, the molecular sieve may be, for example, a zeolite powder.

In a specific embodiment of the expandable acoustic enhancer of the present invention, the binder comprises one or more of a polyacrylate suspension, a polystyrene acetate suspension, a polyvinyl acetate suspension, a polystyrene acrylate suspension and a polybutadiene rubber suspension.

In a specific embodiment of the expandable acoustic enhancer of the present invention, the expandable material comprises one or more of expandable microspheres, expandable graphite, and foaming materials.

In a specific embodiment of the expandable acoustic enhancer of the present invention, the foaming materials comprise, but not limited to, one or more of foamed rubber, foamed plastic, and the like.

In a specific embodiment of the expandable acoustic enhancer of the present invention, the expandable microspheres comprise one or more of acrylate-based, polyurethane-based, polystyrene-based, polyethylene-based, melamine-based microspheres.

In a specific embodiment of the expandable acoustic enhancer of the present invention, the expandable microspheres have a diameter of 0.1-40 μm.

In a specific embodiment of the expandable acoustic enhancer of the present invention, the expandable binder comprises one or more of polyurethane-based and phenolic resin-based binders.

In the present invention, the "expandable" refers to the property of a material to undergo an increase in apparent volume when a triggering condition is applied, e.g., heating, wherein the "expandable" includes expansion by physical change only and foaming by chemical change (i.e., "foamable").

In another aspect, the present invention further provides a method for producing the expandable acoustic enhancer, comprising:

sufficiently mixing raw materials for preparing the expandable acoustic enhancer with a solvent to obtain an expandable acoustic enhancing slurry; and then molding the expandable acoustic enhancing slurry to produce the expandable acoustic enhancer.

In yet another aspect, the present invention further provides a speaker comprising the expandable acoustic enhancer, wherein the speaker comprises one or more acoustic sensors, one or more housings, and one or more expandable acoustic enhancers; the one or more acoustic sensors and the one or more housings are combined to form a rear cavity of the speaker, and the one or more expandable acoustic enhancers are positioned in the rear cavity of the speaker.

In yet another aspect, the present invention further provides a method for assembling the expandable acoustic enhancer, comprising assembling the one or more expandable acoustic enhancers in a specific container to reach an initial assembling state, and applying one or more expansion trigger conditions such that the apparent volume of the one or more expandable acoustic enhancers reaches a target value, so that the one or more expandable acoustic enhancers achieve the completed assembling state.

In a specific embodiment of the method for assembling the expandable acoustic enhancer of the present invention, the specific container is the rear cavity of the speaker.

In a specific embodiment of the method for assembling the expandable acoustic enhancer of the present invention, the specific container is a package for wrapping the expandable acoustic enhancer.

In a specific embodiment of the method for assembling the expandable acoustic enhancer of the present invention, the expandable acoustic enhancer has an apparent volume target value which is 100-150% of the apparent volume before application of the expansion triggering conditions.

Any one of the expandable acoustic enhancing particles and expandable acoustic enhancing sheets, and any two or three of the expandable acoustic enhancing particles, the expandable acoustic enhancing sheets and the expandable acoustic enhancing coating are filled and/or assembled into the rear cavity of the speaker. These expandable acoustic enhancers expand upon application of an expansion trigger conditions and are increased in the apparent volume to exactly fill a specific space in the rear cavity of the speaker of an electronic device.

In a still further aspect, the present invention further provides an electronic device, provided with the expandable acoustic enhancer in a rear cavity of a speaker of the electronic device.

In a specific embodiment of the electronic device of the present invention, the electronic device comprises, but not limited to, a smartphone, a TWS earphone, a headset, a smart glass, a smart watch, a tablet PC or a lightweight laptop.

In the present invention, applying the expandable acoustic enhancer to a speaker and performing a treatment to trigger expansion for the expandable acoustic enhancer results in a larger apparent volume and an increased volume of internal pores of the expandable acoustic enhancer. This improves the acoustic performance of the speaker assembled with the expandable acoustic enhancer, while causing squeezing between the expandable acoustic enhancers and between the expandable acoustic enhancer and the cavity wall of the speaker in a specific space, thereby fixing the expandable acoustic enhancers. As a result, the effect of eliminating noises during the use of the speaker and preventing the acoustic enhancer from colliding with each other and being crushed into powder, thus enhancing the service life of the acoustic enhancer, is achieved.

Moreover, compared with the conventional acoustic enhancing material, after the assembly of the expandable acoustic enhancer provided by the present invention (i.e., after the apparent volume is increased), the aperture value contained in the internal aperture of the expandable acoustic enhancer is also increased accordingly. The increase in the volume of the pores in the overall structure of the expandable acoustic enhancer increases the overall performance of the expandable acoustic enhancer, and the F0 value of the speaker provided with the expandable acoustic enhancer decreases more significantly.

Additionally, in the specific space of the rear cavity of the speaker with a fixed volume (such as the cavity 150 in FIG. 1), after the expansion of the expandable acoustic enhancer increases in apparent volume, due to the squeezing of the expandable acoustic enhancers, larger contact area between the expandable acoustic enhancers and closer contact is obtained, such that the heat can be efficiently transmitted between the expandable acoustic enhancer and the cavity wall of the speaker. This sufficiently improves the heat dissipation efficiency of the heat inside the speaker.

DESCRIPTION OF THE ACCOMPANYING DRAWINGS

In order to more clearly illustrate the technical solutions in the embodiments of the present invention or in the prior art, the accompanying drawings to be used in the description of the embodiments will be briefly described below. Obviously, the accompanying drawings in the following description are only some embodiments of the present invention. For a person of ordinary skill in the art, other accompanying drawings can be obtained based on these drawings without creative labor.

FIG. 1 is a schematic diagram for the structure of a speaker.

FIGS. 2*a* and 2*b* are schematic diagrams for a cross-section of a cavity filled with expandable acoustic enhancing particles.

FIGS. 3*a* and 3*b* are schematic diagrams for a cross-section of a cavity filled with expandable acoustic enhancing sheets.

FIGS. 4*a* and 4*b* are schematic diagrams for a cross-section of a cavity filled with an expandable acoustic enhancing coating.

DETAILED DESCRIPTION OF PREFERRED EMBODIMENTS

As used herein, the term "range" is given in the form of a lower limit and an upper limit. There may be one or more lower limits, and one or more upper limits, respectively. A given range is defined by selecting a lower limit and an upper limit, and the selected lower and upper limits define the boundaries of the particular range. All ranges limited in this manner are combinable, i.e., any lower limit can be combined with any upper limit to form a range. For example, if the ranges of 60-120 and 80-110 are listed for a specific parameter, this is understood to mean that the ranges 60-110 and 80-120 are also expectable. In addition, for a range, if the minimum values listed are 1 and 2 and the maximum values listed are 3, 4 and 5, all the following ranges can be expected: 1-3, 1-4, 1-5, 2-3, 2-4 and 2-5.

In the present invention, the numerical range "a-b" indicates an abbreviated representation of any combination of real numbers between a and b, where both a and b are real numbers, unless specified otherwise. For example, the numerical range "0-5" indicates that all real numbers between "0-5" are already listed in the present invention, and "0-5" is only an abbreviated representation of these combinations of values.

In the present invention, all embodiments as well as preferred embodiments mentioned in the present invention can be combined with each other to form new technical solutions, unless specified otherwise.

In the present invention, all technical features as well as preferred features mentioned in the present invention can be combined with each other to form new technical solutions, unless specified otherwise.

As used herein, the term "comprise" may be either open-ended, or closed-ended, unless specified otherwise. For example, the "comprise" may indicate that other materials and/or components not listed may also be included, or only listed materials and/or components may be included.

In order to have a clearer understanding of the technical features, purposes and beneficial effects of the present invention, the technical solution of the present invention is hereby described in detail below in conjunction with the following specific embodiments, which are not to be construed as limiting the implementable scope of the present invention.

Figure 1:
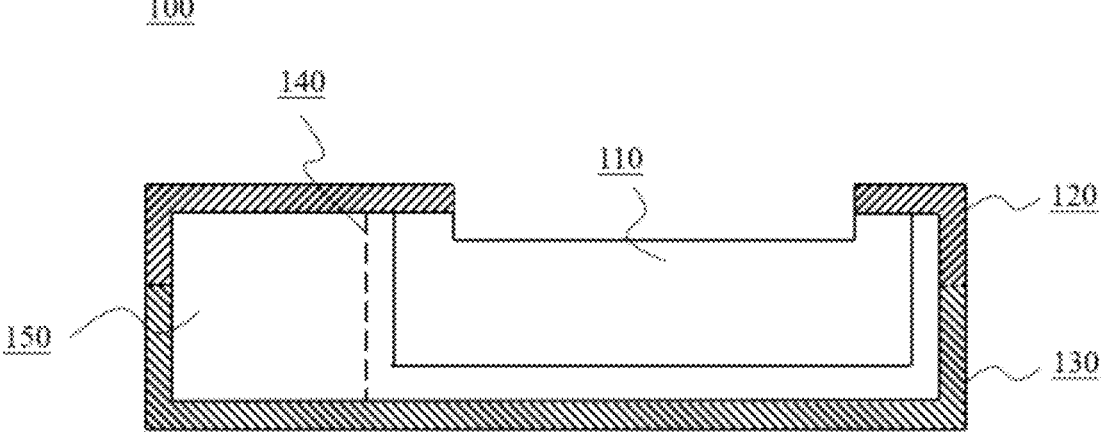

FIG. 1 is a schematic diagram for the structure of a speaker. In some embodiments, the speaker 100 comprises an acoustic sensor 110, an upper speaker housing 120 and a lower speaker housing 130. The acoustic sensor 110 is used to realize the conversion of electrical energy to acoustic energy. The acoustic sensor 110 is fixedly connected to the opening of the upper speaker housing 120, which can realize sound transmission between the acoustic sensor 110 and the external space, and the connection includes, but is not limited to, the form of bonding, fastener connection, plug-in connection, and the like. The upper speaker housing 120 includes an opening. The upper speaker housing 120 is fixedly connected to the lower speaker housing 130, and the connection includes, but are not limited to, the form of bonding, fastener connection, plug-in connection, and the like. The acoustic sensor 110, the upper speaker housing 120, and the lower speaker housing 130 together form a rear cavity of the speaker 100.

In some embodiments, the speaker 100 further includes an acoustic transparent component 140. The acoustic transparent component 140 has a low acoustic resistance and does not interfere with gas flow in the rear cavity. In some embodiments, the acoustic transparent component 140 may be one or more of cloth mesh, metal mesh, plastic mesh, and the like. The acoustic transparent component 140 is assembled in the rear cavity of the speaker 100. In some embodiments, the acoustic transparent component 140 is fixedly connected to each of the upper speaker housing 120 and the lower speaker housing 130, and forms a cavity 150. In some embodiments, the acoustic transparent component 140 may be a three-dimensional structure that directly forms the cavity 150. The acoustic transparent component 140 allows for gas flow between the cavity 150 and the remainder of the rear cavity of the speaker 100. In some embodiments, the cavity 150 may be filled with the expandable acoustic enhancer. The expandable acoustic enhancer allows the speaker 100 to have a lower F0 value by adsorbing gas and better bass performance. In some embodiments, the expandable acoustic enhancer may be one or more of expandable acoustic enhancing particles, expandable acoustic enhancing sheets, an expandable acoustic enhancing coating, and the like. The acoustic transparent component 140 may confine the expandable acoustic enhancer in the cavity 150 when the speaker 100 is in a conventional operating condition of the speaker.

Figure 2A:
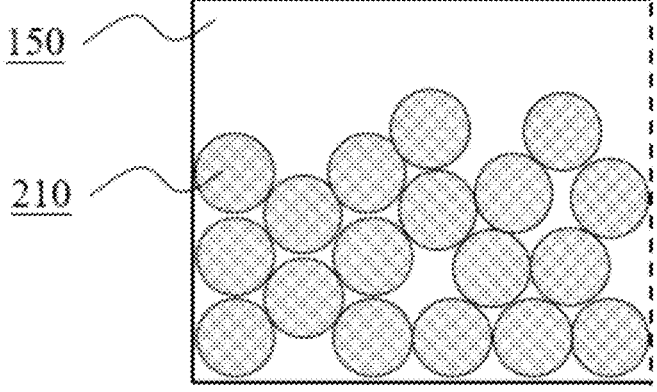
Figure 2B:
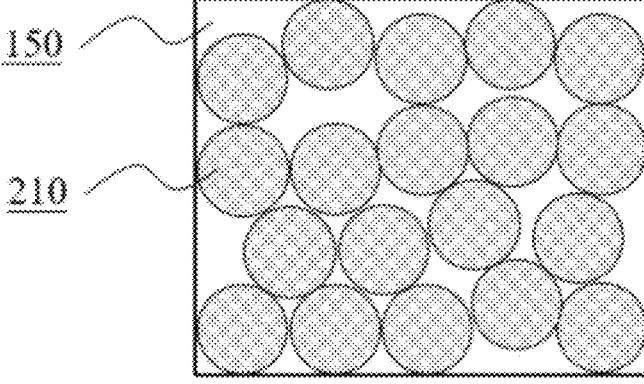

FIGS. 2a and 2b are schematic diagrams for a cross-section of a cavity filled with expandable acoustic enhancing particles. FIG. 2a illustrates an initial filling state of expandable acoustic enhancing particles 210 in the cavity 150. FIG. 2b illustrates a completed filling state of expandable acoustic enhancing particles 210 in the cavity 150.

In some embodiments, at least one sidewall of the cavity 150 is a porous structure that allows for gas flow between the cavity 150 and the remainder of the rear cavity of the speaker 100. In some embodiments, the cavity 150 is filled with a plurality of expandable acoustic enhancing particles 210. The expandable acoustic enhancing particles 210 are porous structures with adsorptive properties that allow for easy adsorption and desorption of gas molecules. The expandable acoustic enhancing particles 210 are filled in the cavity 150 in an amount of 65%-95%. After the expandable acoustic enhancing particles 210 are filled into the cavity 150, the cavity 150 filled with the expandable acoustic enhancing particles 210 is subjected to one or more expansion trigger conditions. The expandable acoustic enhancing particles 210 have a particle diameter of 50-900 µm in the initial filling state, and the particle diameter can be selected based on application scenarios and needs. The expansion triggering conditions comprise, but not limited to, one or more of mechanical force, temperature, humidity, acoustic wave, light, electric current, magnetic field force, chemical atmosphere, air pressure, and the like. In some embodiments, upon application of the one or more expansion trigger conditions, the apparent volume of the expandable acoustic enhancing particles 210 increases to a particular value and then ceases to change, at which point the expandable acoustic enhancing particles 210 reach the completed filling state, and the one or more trigger conditions may persist. In some embodiments, when the apparent volume of the expandable acoustic enhancing particles 210 expands to a particular value, the one or more expansion trigger conditions are removed. In some embodiments, the one or more expansion trigger conditions are removed, when the apparent volume of the expandable acoustic enhancing particles 210 expands to its initial state, which is 105% of its apparent volume before application of the expansion trigger conditions. In some embodiments, the one or more expansion trigger conditions are removed, when the apparent volume of the expandable acoustic enhancing particles 210 expands to its initial state, which is 110% of its apparent volume before application of the expansion trigger conditions. In some embodiments, the one or more expansion trigger conditions are removed, when the apparent volume of the expandable acoustic enhancing particles 210 expands to its initial state, which is 125% of its apparent volume before application of the expansion trigger conditions. In some embodiments, the one or more expansion trigger conditions are removed, when the apparent volume of the expandable acoustic enhancing particles 210 expands to its initial state, which is 135% of its apparent volume before application of the expansion trigger conditions. In some embodiments, the one or more expansion trigger conditions are removed, when the apparent volume of the expandable acoustic enhancing particles 210 expands to its initial state, which is 145% of its apparent volume before application of the expansion trigger conditions. In some embodiments, the one or more expansion trigger conditions are removed, when the apparent volume of the expandable acoustic enhancing particles 210 expands to its initial state, which is 150% of its apparent volume before application of the expansion trigger conditions. In some embodiments, the expandable acoustic enhancing particles 210 reach the completed filling state immediately after the one or more expansion trigger conditions are removed. In some embodiments, after the one or more expansion triggering conditions are removed, the expandable acoustic enhancing particles 210 need to undergo a stabilization period to reach the completed filling state.

The expandable acoustic enhancing particles 210 filled in the cavity 150 exert mechanical force on each other, thus effectively reducing or even eliminating positional movement of the expandable acoustic enhancing particles 210 in the cavity 150. As a result, collisions of the expandable acoustic enhancing particles 210 with each other are effectively reduced or even eliminated, and the service life of the expandable acoustic enhancing particles 210 is sufficiently increased. In addition, the expandable acoustic enhancing particles 210 have an increased size and volume of internal pores inside the particles compared to the conventional acoustic enhancing particles. Under the premise of assembling the same number of expandable acoustic enhancing particles and conventional acoustic enhancing particles, the gas adsorption performance of the expanded acoustic enhancing particles in the completed filling state is better than that of the conventional acoustic enhancing particles, which results in better acoustic performance of the speaker.

Figure 3A:
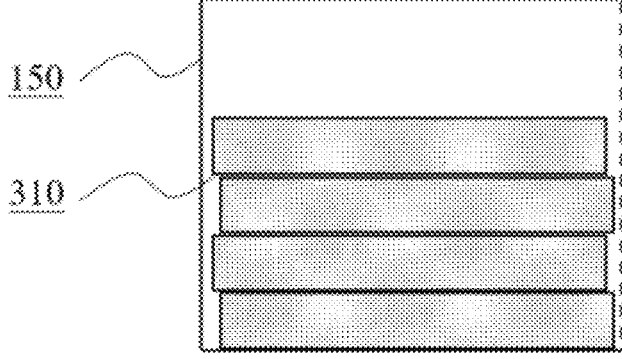
Figure 3B:
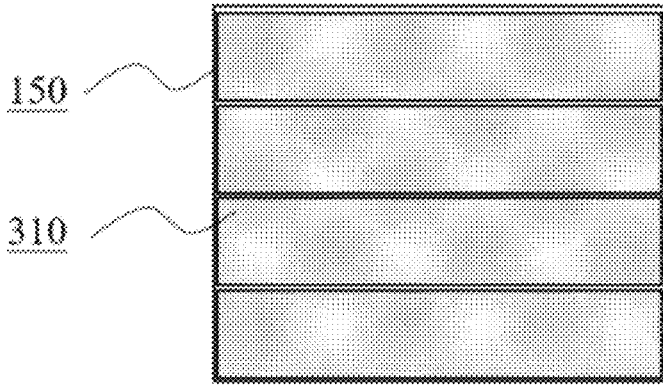

FIGS. 3a and 3b are schematic diagrams for a cross-section of a cavity filled with expandable acoustic enhancing sheets. FIG. 3a illustrates an initial filling state of expandable acoustic enhancing sheets 310 in the cavity 150. FIG. 3b illustrates a completed filling state of expandable acoustic enhancing sheets 310 in the cavity 150.

In some embodiments, at least one sidewall of the cavity 150 is a porous structure that allows for gas flow between the cavity 150 and the remainder of the rear cavity of the speaker 100. In some embodiments, the cavity 150 is filled with a plurality of expandable acoustic enhancing sheets 310. The expandable acoustic enhancing sheets 310 are porous structures with adsorptive properties that allow for easy adsorption and desorption of gas molecules. The expandable acoustic enhancing sheets 310 are filled in the cavity 150 in an amount of 75%-95%. After the expandable acoustic enhancing sheets 310 are filled into the cavity 150, the cavity 150 filled with the expandable acoustic enhancing sheets 310 is subjected to one or more expansion trigger conditions. The expandable acoustic enhancing sheets 310 have a particle diameter of 50-900 μm in the initial filling state, and the sheet thickness can be selected based on application scenarios and needs. The expansion triggering conditions comprise, but not limited to, one or more of mechanical force, temperature, humidity, acoustic wave, light, electric current, magnetic field force, chemical atmosphere, air pressure, and the like. In some embodiments, upon application of the one or more expansion trigger conditions, the apparent volume of the expandable acoustic enhancing sheet 310 increases to a particular value and then ceases to change, at which point the expandable acoustic enhancing sheet 310 reach the completed filling state, and the one or more trigger conditions may persist. In some embodiments, when the apparent volume of the expandable acoustic enhancing sheet 310 expands to a particular value, the one or more expansion trigger conditions are removed. In some embodiments, the one or more expansion trigger conditions are removed, when the apparent volume of the expandable acoustic enhancing sheet 310 expands to its initial state, which is 105% of its apparent volume before application of the expansion trigger conditions. In some embodiments, the one or more expansion trigger conditions are removed, when the apparent volume of the expandable acoustic enhancing sheet 310 expands to its initial state, which is 110% of its apparent volume before application of the expansion trigger conditions. In some embodiments, the one or more expansion trigger conditions are removed, when the apparent volume of the expandable acoustic enhancing sheet 310 expands to its initial state, which is 125% of its apparent volume before application of the expansion trigger conditions. In some embodiments, the one or more expansion trigger conditions are removed, when the apparent volume of the expandable acoustic enhancing sheet 310 expands to its initial state, which is 135% of its apparent volume before application of the expansion trigger conditions. In some embodiments, the one or more expansion trigger conditions are removed, when the apparent volume of the expandable acoustic enhancing sheet 310 expands to its initial state, which is 145% of its apparent volume before application of the expansion trigger conditions. In some embodiments, the one or more expansion trigger conditions are removed, when the apparent volume of the expandable acoustic enhancing sheet 310 expands to its initial state, which is 150% of its apparent volume before application of the expansion trigger conditions. In some embodiments, the expandable acoustic enhancing sheet 310 reaches the completed filling state immediately after the one or more expansion trigger conditions are removed. In some embodiments, after the one or more expansion triggering conditions are removed, the expandable acoustic enhancing sheet 310 needs to undergo a stabilization period to reach the completed filling state.

The expandable acoustic enhancing sheets 310 filled in the cavity 150 exert mechanical force on each other, effectively reducing or even eliminating positional movement of the expandable acoustic enhancing sheets 310 in the cavity 150. As a result, collisions of the expandable acoustic enhancing sheets 310 with each other are effectively reduced or even eliminated, and the service life of the expandable acoustic enhancing sheets 310 is sufficiently increased. In addition, the expandable acoustic enhancing sheets 310 have an increased size and volume of internal pores of the particles compared to the conventional acoustic enhancing sheets. Under the premise of assembling the same number of expandable acoustic enhancing sheets and conventional acoustic enhancing sheets, the gas adsorption performance of the expanded acoustic enhancing sheets in the completed filling state is better than that of the conventional acoustic enhancing sheets, which results in better acoustic performance of the speaker.

Figure 4A:
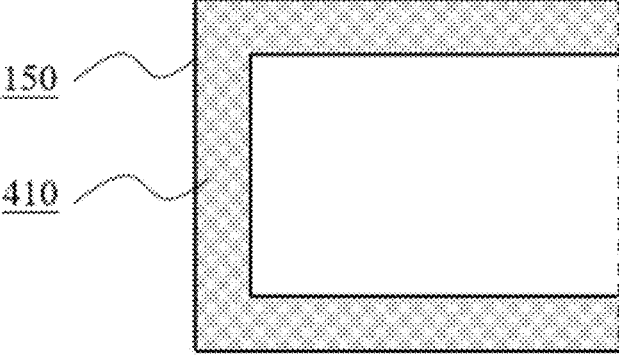
Figure 4B:
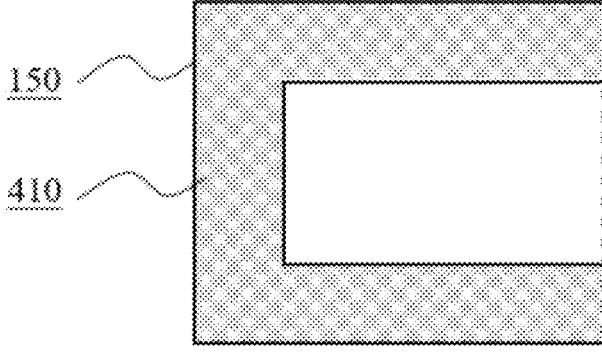

FIGS. 4a and 4b are schematic diagrams for a cross-section of a cavity filled with expandable acoustic enhancing coating. FIG. 4a illustrates an initial assembling state of an expandable acoustic enhancing coating 410 in the cavity 150. FIG. 4b illustrates a completed assembling state of the expandable acoustic enhancing coating 410 in the cavity 150.

In some embodiments, at least one sidewall of the cavity 150 is a porous structure that allows for gas flow between the cavity 150 and the remainder of the rear cavity of the speaker 100. In some embodiments, the cavity 150 is filled with the expandable acoustic enhancing coating 410. The expandable acoustic enhancing coating 410 is a porous structure with adsorptive properties that allow for easy adsorption and desorption of gas molecules. Processes for assembling the expandable acoustic enhancing coating 410 to one or more walls of the cavity 150 include, but are not limited to, one or more of spraying, brushing, vapor deposition, and the like. The thickness and area of the expandable acoustic enhancing coating 410 may be selected based on the acoustic performance requirements of the speaker 100. After the expandable acoustic enhancing coating 410 is assembled into the cavity 150, the cavity 150 assembled with the expandable acoustic enhancing coating 410 is subjected to one or more expansion trigger conditions. The expansion triggering conditions comprise, but not limited to, one or more of mechanical force, temperature, humidity, acoustic wave, light, electric current, magnetic field force, chemical atmosphere, air pressure, and the like. In some embodiments, upon application of the one or more expansion trigger conditions, the apparent volume of the expandable acoustic enhancing coating 410 increases to a particular value and then ceases to change, at which point the expandable acoustic enhancing coating 410 reaches the completed assembling state, and the one or more trigger conditions may persist. In some embodiments, when the apparent volume of the expandable acoustic enhancing coating 410 expands to a particular value, the one or more expansion trigger conditions are removed. In some embodiments, the one or more expansion trigger conditions are removed, when the apparent volume of the expandable acoustic enhancing coating 410 expands to its initial state, which is 105% of its apparent volume before application of the expansion trigger conditions. In some embodiments, the one or more expansion trigger conditions are removed, when the apparent volume of the expandable acoustic enhancing coating 410 expands to its initial state, which is 110% of its apparent volume before application of the expansion trigger conditions. In some embodiments, the one or more expansion trigger conditions are removed, when the apparent volume of the expandable acoustic enhancing coating 410 expands to its initial state, which is 125% of its apparent volume before application of the expansion trigger conditions. In some embodiments, the one or more expansion trigger conditions are removed, when the apparent volume of the expandable acoustic enhancing coating 410 expands to its initial state, which is 135% of its apparent volume before application of the expansion trigger conditions. In some embodiments, the one or more expansion trigger conditions are removed, when the apparent volume of the expandable acoustic enhancing coating 410 expands to its initial state, which is 145% of its apparent volume before application of the expansion trigger conditions. In some embodiments, the one or more expansion trigger conditions are removed, when the apparent volume of the expandable acoustic enhancing coating 410 expands to its initial state, which is 150% of its apparent volume before application of the expansion trigger conditions. In some embodiments, the expandable acoustic enhancing coating 410 reaches the completed assembling state immediately after the one or more expansion trigger conditions are removed. In some embodiments, after the one or more expansion triggering conditions are removed, the expandable acoustic enhancing coating 410 needs to undergo a stabilization period to reach the completed assembling state.

The expandable acoustic enhancing coating 410 assembled in the cavity 150 is fixed to a wall of the cavity 150, which avoids collision of the particles with each other after filling conventional acoustic enhancing particles and improves the service life. The expandable acoustic enhancing coating 410 can also be adapted to different shapes of the cavity 150. In particular, in the cavity 150 having an irregular shape, having a narrow space, or the like, the filling rate of the expandable acoustic enhancing coating 410 is higher than the filling rate of the expandable acoustic enhancing particles 210 and the expandable acoustic enhancing sheet 310. In addition, the expandable acoustic enhancing coating 410 has an increased size and volume of internal pores of the particles compared to the conventional acoustic enhancing coating. Under the premise of assembling the expandable acoustic enhancing coating and conventional acoustic enhancing coating with the same thickness, the gas adsorption performance of the expanded acoustic enhancing coating in the completed assembling state is better than that of the conventional acoustic enhancing coating, which results in better acoustic performance of the speaker.

In some embodiments, the cavity 150 may be filled with only the expandable acoustic enhancing particles 210 and the expandable acoustic enhancing sheets 310, or assembled with only the expandable acoustic enhancing coating 410. In some embodiments, the cavity 150 may be filled and/or assembled with one or more of the expandable acoustic enhancing particles 210, the expandable acoustic enhancing sheets 310 and the expandable acoustic enhancing coating 410. In some embodiments, the cavity 150 may be filled and/or assembled with one or more of the expandable acoustic enhancing particles 210, the expandable acoustic enhancing sheets 310 and the expandable acoustic enhancing coating 410 along with other accessories. The other accessories include, but are not limited to, one or more of inserts, frames, gaskets, and the like.

In some embodiments, the expandable acoustic enhancing particles 210 and/or expandable acoustic enhancing sheets 310 that are filled into the cavity 150, and the expandable acoustic enhancing coating 410 that is assembled into the cavity 150 are ready to be used in the initial assembling state. During use of the speaker, the expandable acoustic enhancing particles 210, the expandable acoustic enhancing sheets 310 and/or the expandable acoustic enhancing coating 410 increase in apparent volume under the conditions of the thermal field, the electromagnetic field, the airflow environment, and the like of the speaker, to reach the completed assembling state.

In some embodiments, under the completed filling/assembling state of the expandable acoustic enhancing particles 210 and/or expandable acoustic enhancing sheets 310 that are filled into the cavity 150, and the expandable acoustic enhancing coating 410 that is assembled into the cavity 150, the speaker 100 comprising the cavity 150 is ready to use. During use of the speaker, the expandable acoustic enhancing particles 210, the expandable acoustic enhancing sheets 310 and/or the expandable acoustic enhancing coating 410 may undergo a secondary change in apparent volume to ultimately achieve a satisfactory state of use.

Figure 5:
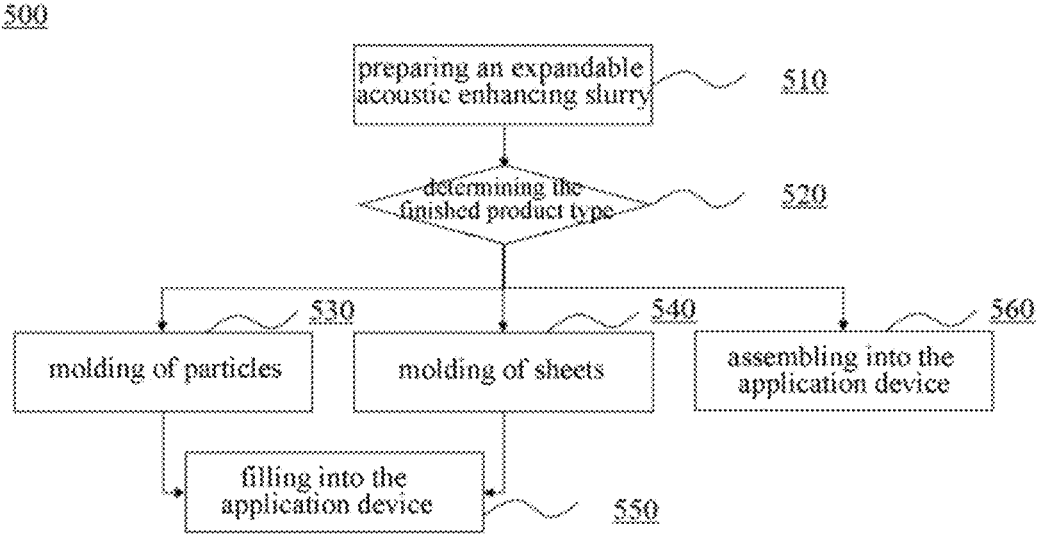
FIG. 5 is a schematic diagram for the flowchart of preparing an expandable acoustic material.

FIG. 5 is a schematic diagram for the flowchart 500 of preparing the expandable acoustic enhancer. In step 510, an expandable acoustic enhancing slurry is prepared. In some embodiments, a gas adsorption material, an expandable material, a binder, and a solvent are thoroughly mixed to form a slurry. The gas adsorption material is a porous material with adsorptive properties, and comprises, but not limited to, one or more of molecular sieves, activated carbon, porous metal oxides, porous metal-organic frameworks (MOFs), and the like. An expandable material is a material having an apparent volume increased when specific expansion triggering conditions are applied. The increase of the apparent volume of an expandable material under specific expansion triggering conditions may occur without a chemical change, such as thermal expansion, or with a chemical change, such as foaming. The expandable material comprises, but not limited to, one or more of expandable microspheres, expandable graphite, foaming materials, and the like. The expandable microspheres comprise, but not limited to, one or more of acrylate-based, polyurethane-based, polystyrene-based, polyethylene-based, melamine-based microspheres, and the like. In some embodiments, the expandable microspheres have a diameter between 0.1 and 40 μm. In some embodiments, the expandable microspheres may be ruptured during expansion. The foaming materials include, but not limited to, one or more of foaming rubber, foaming plastic, and the like. The binder is used to bond the gas adsorption material and the expandable material together, and comprises, but not limited to, one or more of a polyacrylate suspension, a polystyrene acetate suspension, a polyvinyl acetate suspension, a polystyrene acrylate suspension, a polybutadiene rubber suspension, and the like. The solvent comprises, but not limited to, one or more of water, ethanol, and the like. The expandable material is included in an amount of 0.1-10%, and the binder is included in an amount of 1-10%, based on 100% of the total weight of the gas adsorption material; wherein the amount of the binder is measured based on the solid content in the binder.

In some other embodiments, a gas adsorption material, an expandable binder and a solvent are thoroughly mixed to form a slurry. The gas adsorption material is a porous material with adsorptive properties, and comprises, but not limited to, one or more of molecular sieves, activated carbon, porous metal oxides, porous metal-organic frameworks (MOFs), and the like. An expandable binder is a binder having an apparent volume increased when specific expansion triggering conditions are applied. The increased apparent volume of an expandable binder under specific expansion triggering conditions may occur without a chemical change, such as thermal expansion, or with a chemical change, such as foaming. The expandable binder comprises, but not limited to, one or more of polyurethane-based resins, phenolic resins, and the like. The solvent comprises, but not limited to, one or more of water, ethanol, polyols (e.g., glycerol), and the like. The expandable binder is included in an amount of 0.5-10%, based on 100% of the total weight of the gas adsorption material; wherein the amount of the expandable binder is measured based on the solid content in the expandable binder. In some embodiments, a gas adsorption material, an expandable binder, a binder and a solvent are thoroughly mixed to form a slurry. The binder comprises, but not limited to, one or more of a polyacrylate suspension, a polystyrene acetate suspension, a polyvinyl acetate suspension, a polystyrene acrylate suspension, a polybutadiene rubber suspension, and the like.

In step 520, the finished product type is determined. The finished product type includes, but not limited to, particles, sheet layers, coatings applied to specific devices, and the like. As the finished product type is identified as particles, it proceeds to step 530; as the finished product type is identified as a sheet layer, it proceeds to step 540; as the finished product type is identified as a coating applied to a specific device, and it proceeds to step 560.

In step 530, the slurry prepared in step 510 is molded into expandable acoustic enhancing particles. Molding processes include, but not limited to, mixing granulation, spray drying granulation, boiling granulation, spraying, dispersing mist, and the like. Specific process parameters of molding may be selected as desired.

In step 540, the slurry prepared in step 510 is molded into expandable acoustic enhancing sheets. Molding processes include, but not limited to, a natural solidification method, a roasting method, a freeze-drying method, and the like. Specific process parameters of molding may be selected as desired.

The next step after both step 530 and step 540 is step 550. In step 550, the prepared expandable acoustic enhancing particles and/or expandable acoustic enhancing sheets are filled onto an application device. In some embodiments, the application device is a speaker. Up to this point, the expandable acoustic enhancing particles and/or the expandable acoustic enhancing sheets have reached the initial filling state in the speaker.

In step 560, the expandable acoustic enhancing coating is assembled on the application device with the slurry prepared in step 510. Assembling processes include, but not limited to, spraying, painting, vapor deposition, and the like. Specific process parameters may be selected as desired. In some embodiments, the application device is a speaker. Up to this point, the expandable acoustic enhancing coating has reached the initial assembling state in the speaker.

Example 1

This example provides expandable acoustic enhancing particles, which are produced by a method comprising the following steps:

100 g of zeolite powder, 6 g of polyacrylate binder (the amount of the binder is measured based on the solid content in the binder), 0.5 g of acrylate-based expandable microspheres (having a diameter of 5-10 μm), and an appropriate amount of water are formulated into a homogeneous slurry.

Subsequently, the slurry is spray dried to obtain the expandable acoustic enhancing particles having a diameter of 200-400 μm.

Figure 6:
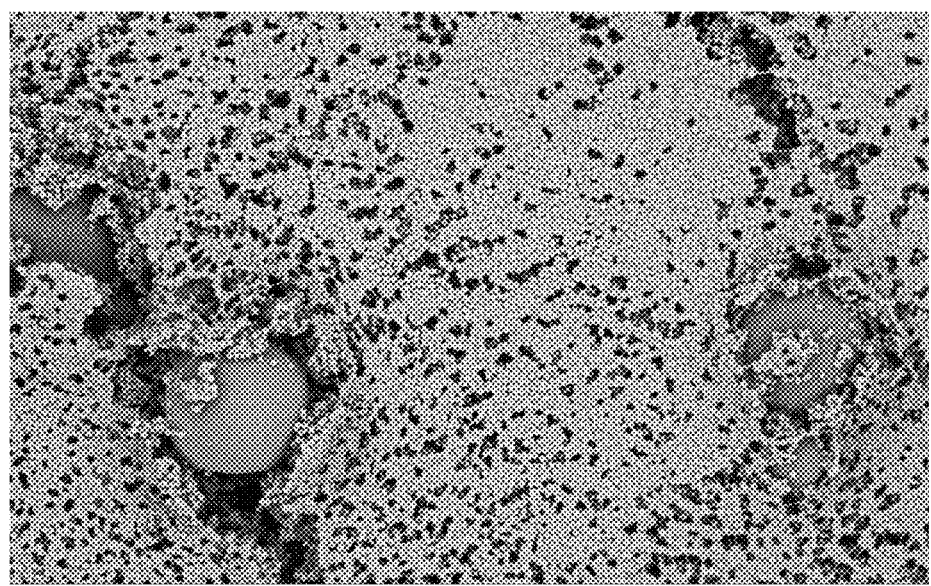
FIG. 6 is a scanning electron micrograph of a cross-section of the expandable acoustic enhancing particles prepared in Example 1 of the present invention.

FIG. 6 is a scanning electron micrograph of a cross-section of the expandable acoustic enhancing particles prepared in Example 1 of the present invention. The continuous structure in FIG. 6 is formed by bonding zeolite powder, and the spherical structure is acrylate-based expandable microspheres. The pores between the continuous structures are those formed naturally during the preparation process, and can be used as the movement channel of gas molecules, which makes the internal utilization rate of the expandable acoustic enhancing particles increase, and further improves the low-frequency performance of the speaker. The outer surface of the acrylate-based expandable microspheres is partially bonded to the zeolite continuous structure. The acrylate-based expandable microspheres are evenly distributed in the continuous structure of the zeolite. A single expandable acoustic enhancing particle is homogeneous in nature and not stratified inside or outside.

Example 2

This example provides expandable acoustic enhancing particles, which are produced by a method comprising the following steps:

100 g of metal-organic framework porous material powder, 10 g of polystyrene acrylate binder (the amount of the binder is measured based on the solid content in the binder), 10 g of acrylate-based expandable microspheres (having a diameter of 5-10 μm), and an appropriate amount of ethanol are formulated into a homogeneous slurry.

Subsequently, the slurry is granulated by stirring to obtain the expandable acoustic enhancing particles having a diameter of 400-600 μm.

Example 3

This example provides expandable acoustic enhancing particles, which are produced by a method comprising the following steps:

100 g of zeolite powder, 9 g of expandable phenolic resin binder (the amount of the binder is measured based on the solid content in the binder) and an appropriate amount of water are formulated into a homogeneous slurry.

Subsequently, the slurry is spray dried to obtain the expandable acoustic enhancing particles having a diameter of 600-900 μm.

Example 4

This example provides expandable acoustic enhancing particles, which are produced by a method comprising the following steps:

100 g of zeolite powder, 2.5 g of expandable phenolic resin binder (the amount of the binder is measured based on the solid content in the binder) and an appropriate amount of glycerol are formulated into a homogeneous slurry.

Subsequently, the slurry is spray dried to obtain the expandable acoustic enhancing particles having a diameter of 600-900 μm.

Example 5

This example provides expandable acoustic enhancing sheets, which are produced by a method comprising the following steps:

100 g of activated carbon, 4 g of polybutadiene rubber binder (the amount of the binder is measured based on the solid content in the binder), 1.5 g of polyurethane-based expandable microspheres (having a diameter of 5-10 μm), and an appropriate amount of water are formulated into a homogeneous slurry.

Subsequently, the slurry is poured into a specific mold and roasted to obtain the expandable acoustic enhancing sheets having a thickness of 200-400 μm.

Example 6

This example provides an expandable acoustic enhancing coating, which is produced by a method comprising the following steps:

100 g of zeolite powder, 6 g of polybutadiene rubber binder (the amount of the binder is measured based on the solid content in the binder), 8 g of expandable graphite and an appropriate amount of glycerol are formulated into a homogeneous slurry.

The slurry is assembled to the speaker by spraying, thereby forming the expandable acoustic enhancing coating

Comparative Example 1

This comparative example provides expandable acoustic enhancing particles, which are produced by a method comprising the following steps:

100 g of zeolite powder, 6 g of polyacrylate binder (the amount of the binder is measured based on the solid content in the binder) and an appropriate amount of water are formulated into a homogeneous slurry.

Subsequently, the slurry is spray dried to obtain the expandable acoustic enhancing particles having a diameter of 200-400 μm.

Application Example 1

This application example provides an application of the expandable acoustic enhancing particles of Example 1 in a speaker of an electronic device, comprising the following specific steps:

The expandable acoustic enhancing particles of Example 1 are filled into the speaker cavity 150 at 80% of the volume of the speaker cavity 150 and encapsulated.

The speaker filled with the expandable acoustic enhancing particles of Example 1 is subjected to a heat triggering treatment at 110° C. for 30 min to obtain a speaker filled with the expandable acoustic enhancing particles.

The expandable acoustic enhancing particles in the speaker can fill the cavity 150 just enough after the heat triggering treatment at 110° C. for 30 min, and the particles are fixed by squeezing the particles against each other.

Application Example 2

This application example provides an application of the expandable acoustic enhancing particles of Example 2 in a speaker of an electronic device, comprising the following specific steps:

The expandable acoustic enhancing particles of Example 2 are filled into the speaker cavity 150 at 80% of the volume of the speaker cavity 150 and encapsulated.

The speaker filled with the expandable acoustic enhancing particles of Example 2 is subjected to a heat triggering treatment at 140° C. for 20 min to obtain a speaker filled with the expandable acoustic enhancing particles.

The expandable acoustic enhancing particles in the speaker cavity 150 can fill the cavity 150 just enough after the heat triggering treatment at 140° C. for 20 min, and the particles are fixed by squeezing the particles against each other.

Comparative Application Example 1

This comparative application example provides an application of the expandable acoustic enhancing particles of Comparative Example 1 in a speaker of an electronic device, comprising the following specific steps:

The expandable acoustic enhancing particles of Comparative Example 1 are filled into the speaker cavity 150 at 80% of the volume of the speaker cavity 150 and encapsulated.

There is an amount of free space for movement of the acoustic enhancing material particles in the speaker.

Comparative Application Example 2

This comparative application example provides an application of acoustic enhancing material particles of Comparative Example 1 and conventional expandable microspheres in a speaker of an electronic device, comprising the following specific steps:

After evenly mixing the acoustic enhancing material particles of Comparative Example 1 with commercially available expandable microspheres (commercial model Delta 301h) at a mass ratio of 100:1, the resulting mixed system is filled into the speaker cavity 150 at 80% of the volume of the speaker cavity 150 and encapsulated.

The filled speaker is subjected to a heat triggering treatment at 110° C. for 30 min to obtain a speaker filled with a mixed system of acoustic enhancing material particles and expandable microspheres.

After the triggering treatment, the acoustic enhancing material particles are fixed in the speaker by squeezing the acoustic enhancing material particles by the expandable microspheres.

Testing Example 1

In this testing example, the speakers produced in Application Examples 1-2 and Comparative Application Examples 1-2 above are tested for acoustic performance (F0), particle collision sound, and drop test for falling powder, respectively, and the speakers are disassembled to observe the filling state of the acoustic enhancing materials therein. The tests are conducted by conventional methods in the field, such as the specific test method of acoustic performance, which can be seen from the method of "measurement of electrical impedance" shown in paragraph 0049-0054 of Chinese patent CN105049997A. Specifically, each speaker is tested separately according to the method of "measurement of electrical impedance" to obtain an electrical impedance profile. The curve in the electrical impedance profile corresponds to the electrical impedance curve, and the frequency at which the highest point of the electrical impedance curve exists corresponds to F0. In this testing example, the test environment is a speaker module with a cavity 150 of 0.2 cc.

The test results are shown in Table 1 below:

TABLE 1

| Scheme | Empty cavity F0(Hz) | F0 after filling (Hz) | F0 after expansion treatment (Hz) | F0 decrease after expansion (Hz) | Particle collision sound | Drop Test Falling powder | Filling state |
|---|---|---|---|---|---|---|---|
| Application Example 1 | 885 | 770 | 756 | 14 | No | No | Dense |

TABLE 1-continued

| Scheme | Empty cavity F0(Hz) | F0 after filling (Hz) | F0 after expansion treatment (Hz) | F0 decrease after expansion (Hz) | Particle collision sound | Drop Test Falling powder | Filling state |
|---|---|---|---|---|---|---|---|
| Application Example 2 | 882 | 773 | 763 | 10 | No | No | Dense |
| Comparative Application Example 1 | 880 | 766 | 765 | 1 | Yes | Slight | Loose |
| Comparative Application Example 2 | 882 | 767 | 772 | −5 | No | No | Dense |

Testing Example 2

In this testing example, the speakers produced in Application Examples 1-2 and Comparative Application Examples 1-2 above are tested for electrical reliability at high temperature and high humidity, respectively. The tests are conducted by conventional methods in the field, such as the specific test method of acoustic performance (F0 and ΔF0), which can be seen from the method of "measurement of electrical impedance" shown in paragraph 0049-0054 of Chinese patent CN105049997A. Specifically, each speaker before and after the reliability test is tested separately according to the method of "measurement of electrical impedance" to obtain an electrical impedance profile. The curve in the electrical impedance profile corresponds to the electrical impedance curve, and the frequency at which the highest point of the electrical impedance curve exists corresponds to F0. As a result, F0 before reliability test and F0 after reliability test can be obtained.

In addition, the speaker ΔF0 after reliability test is calculated according to the following equation (2):

$$\text{Speaker } \Delta F0 \text{ after reliability test} = F0 \text{ after reliability test} - \text{empty cavity } F0 \quad \text{[Equation (2)]}$$

In this testing example, the reliability test is carried out under conditions as follows: temperature 65° C., humidity 95% RH, voltage 3.6V, and powder noise signal 168H.

Figure 7:
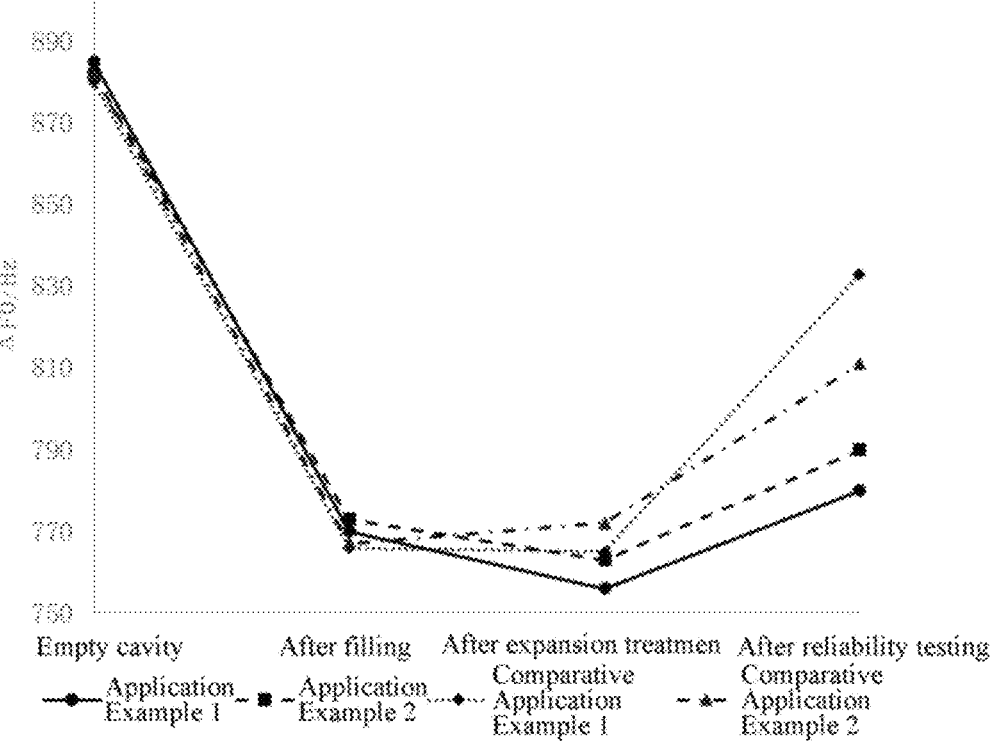
FIG. 7 is a graph of the test results obtained from the high temperature and high humidity electrical reliability test of the speaker prepared in Application Examples 1-2, and Comparative Application Examples 1-2, respectively, in Test Example 2 of the present invention.

The test results are shown in FIG. 7 and Table 2 below:

TABLE 2

| Scheme | F0 before reliability test (Hz) | F0 after reliability test (Hz) | F0 decrease after reliability test (Hz) | Speaker ΔF0 after reliability test (Hz) |
|---|---|---|---|---|
| Application Example 1 | 756 | 779 | 23 | 107 |
| Application Example 2 | 763 | 787 | 25 | 94 |
| Comparative Application Example 1 | 765 | 853 | 88 | 27 |
| Comparative Application Example 2 | 772 | 805 | 33 | 77 |

As can be seen from Tables 1 and 2 above, the improved acoustic enhancing material particles, i.e., expandable acoustic enhancing particles provided in Example 1 of the present invention can fill up the speaker cavity 150 after heat treatment, and the particles can be completely fixed in the speaker cavity 150 without particle collision, falling powder and the like. Furthermore, in terms of acoustic performance, the improved acoustic enhancing material particles provided in Example 1 of the present invention have a performance improvement of about 12% compared to the conventional acoustic enhancing material particles provided in Comparative Example 1. "12%" is calculated based on the experimental data in Table 1 according to the following Equation (1):

$$\eta = ((\text{empty cavity } F0 - F0 \text{ after expansion treatment})_{Application\ Example\ 1} - (\text{empty cavity } F0 - F0 \text{ after expansion treatment})_{Comparative\ Application\ Example\ 1}) / (\text{empty cavity } F0 - F0 \text{ after expansion treatment})_{Comparative\ Application\ Example\ 1}) \quad \text{[Equation (1)]}$$

In addition, in terms of reliability, compared to conventional acoustic enhancing material particles, the improved acoustic enhancing material particles provided in Example 1 of the present invention have superior reliability. In summary, compared to the existing technical solutions for solving the problem of noise and falling powder, the expandable acoustic enhancing particles provided in the examples of the present invention have significantly better acoustic performance and reliability performance.

Testing Example 3

In this testing example, the expandable acoustic enhancing particles produced in Example 1 and the acoustic enhancing material particles produced in Comparative Example 1 are tested for thermal conductivity by a heat transfer experiment, wherein steps of the heat transfer experiment comprise:

1) The acoustic enhancing material particles produced in Comparative Example 1 and the expandable acoustic enhancing particles produced in Example 1 were filled into a carrier tube, respectively. For simulating a real use scenario, the filling amount of conventional acoustic enhancing material particles and expandable acoustic enhancing particles in the carrier tube is 80% of the volume of the filling cavity. The body of the carrier tube is made of rigid heat-insulating material with copper heat-conducting blocks at both axial ends. The heat conductive blocks seal the filling cavity of the carrier tube having an aspect ratio of greater than 5.

2) Each of carrier tubes filled with conventional acoustic enhancing particles and expandable acoustic enhancing particles, respectively, was treated at 110° C. for 30 min and then cooled to room temperature.

3) At room temperature, one axial end of the carrier tube was exposed to a constant heat source (100° C.) and the other end was exposed to a thermocouple, and the temperatures measured by the thermocouple were recorded after various time periods.

The test results are shown in Table 3 below:

TABLE 3

| Scheme | Starting temperature | Temperature after 5 minutes | Temperature after 10 minutes |
|---|---|---|---|
| Example 1 | 25.1° C. | 41.6° C. | 49.2° C. |
| Comparative Example 1 | 25.2° C. | 36.4° C. | 43.1° C. |

As can be seen from Table 3 above, compared to conventional acoustic enhancing material particles in the prior art, the expandable acoustic enhancing particles provided in Example 1 of the present invention have more excellent thermal conductivity due to the fact that the expandable material increases the apparent volume of particles during the heat triggering treatment. After the expansion of particles increases in apparent volume, due to the squeezing between the particles, the contact area between the particles becomes larger and the contact is more tight, thereby improving the heat-conducting performance of the expandable acoustic enhancing particles.

The above mentioned are only specific examples of the present invention and cannot be used to limit the scope of the implementation of the invention. Therefore, the replacement of equivalent components or equivalent changes and modifications made in accordance with the scope of protection of the patent of the present invention shall still fall within the scope encompassed by the patent. In addition, various technical features, the technical features and technical inventions, and various technical inventions of the present invention can be arbitrarily combined and used.

The invention claimed is:

1. An expandable acoustic enhancer, wherein the expandable acoustic enhancer has an increase in apparent volume and an increase in internal pore volume upon application of one or more expansion triggering conditions;
   wherein the expandable acoustic enhancer is produced by mixing raw materials for preparing the expandable acoustic enhancer with a solvent to formulate an expandable acoustic enhancing slurry and then molding the slurry;
   wherein the raw materials comprise a gas adsorption material, a binder and an expandable material; alternatively, the raw materials comprise a gas adsorption material and an expandable binder.

2. The expandable acoustic enhancer according to claim 1, wherein the expandable acoustic enhancer has homogeneous properties from its inside to its surface and is not layered.

3. The expandable acoustic enhancer according to claim 1, wherein upon application of one or more expansion triggering conditions, the expandable acoustic enhancer has an apparent volume which is 105%-150% of its apparent volume before application of the expansion triggering conditions.

4. The expandable acoustic enhancer according to claim 1, wherein the expansion triggering conditions include one or more of mechanical force, temperature, humidity, acoustic wave, light, electric current, magnetic field force, chemical atmosphere and air pressure.

5. The expandable acoustic enhancer according to claim 1, wherein in the initial state, when the expandable acoustic enhancer is expandable acoustic enhancing particles, the expandable acoustic enhancing particles have a diameter of 50-900 μm, and when the expandable acoustic enhancer is expandable acoustic enhancing sheets, the expandable acoustic enhancing sheets have a thickness of 50-900 μm.

6. The expandable acoustic enhancer according to claim 1,
   when the raw materials comprise a gas adsorption material, a binder and an expandable material, the expandable material is included in an amount of 0.1-10% and the binder is included in an amount of 1-10%, based on 100% of the total weight of the gas adsorption material; and when the raw materials comprise a gas adsorption material and an expandable binder, the expandable binder is included in an amount of 0.5-10%, based on 100% of the total weight of the gas adsorption material;
   wherein the amount of the binder and expandable binder is measured based on the solid content in the binder or expandable binder.

7. The expandable acoustic enhancer according to claim 6, wherein the gas adsorption material comprises one or more of molecular sieves, activated carbon, porous metal oxides and porous metal-organic frameworks.

8. The expandable acoustic enhancer according to claim 6, wherein the expandable material comprises one or more of expandable microspheres, expandable graphite, and foaming materials.

9. The expandable acoustic enhancer according to claim 6, wherein the expandable binder comprises one or more of polyurethane-based binders and phenolic resin-based binders.

10. A method for producing the expandable acoustic enhancer according to claim 1, comprising:
    sufficiently mixing raw materials for preparing the expandable acoustic enhancer with a solvent to obtain an expandable acoustic enhancing slurry; and then
    molding the expandable acoustic enhancing slurry to produce the expandable acoustic enhancer.

11. A speaker comprising the expandable acoustic enhancer according to claim 1, wherein the speaker comprises one or more acoustic sensors, one or more housings, and one or more expandable acoustic enhancers;
    the one or more acoustic sensors and the one or more housings are combined to form a rear cavity of the speaker, and the one or more expandable acoustic enhancers are positioned in the rear cavity of the speaker.

12. A method for assembling the expandable acoustic enhancer according to claim 1, comprising assembling the one or more expandable acoustic enhancers in a specific container to reach an initial assembling state, and applying one or more expansion trigger conditions such that the apparent volume of the one or more expandable acoustic enhancers reaches a target value, so that the one or more expandable acoustic enhancers achieve a completed assembling state.

13. The method for assembling the expandable acoustic enhancer according to claim 12, wherein the specific container is the rear cavity of the speaker.

14. The method for assembling the expandable acoustic enhancer according to claim 12, wherein the specific container is a package for wrapping the expandable acoustic enhancer.

15. The method for assembling the expandable acoustic enhancer according to claim 12, wherein the expandable acoustic enhancer has an apparent volume target value which is 105%-150% of its apparent volume before application of the expansion triggering conditions.

16. An electronic device, provided with the expandable acoustic enhancer according to claim 1 in a rear cavity of a speaker of the electronic device.

17. The electronic device according to claim 16, wherein the electronic device comprises a smartphone, a TWS earphone, a headset, a smart glass, a smart watch, a tablet PC or a lightweight laptop.

\* \* \* \* \*